(12) United States Patent
Wala et al.

(10) Patent No.: US 11,751,542 B1
(45) Date of Patent: Sep. 12, 2023

(54) METHOD AND SYSTEM FOR ANIMAL GROWTH REGULATION FOR IMPROVED PROFITABILITY AND MITIGATED RISK

(71) Applicant: American Institute of Nutrition and Management Inc., Shoreview, MN (US)

(72) Inventors: Fazal Wala, St. Paul, MN (US); Charles A. Lemaire, Apple Valley, MN (US); Alexander B. Lemaire, Edina, MN (US)

(73) Assignee: American Institute of Nutrition and Management Inc., Shoreview, MN (US)

(*) Notice: Subject to any disclaimer, the term of this patent is extended or adjusted under 35 U.S.C. 154(b) by 0 days.

(21) Appl. No.: 17/689,313

(22) Filed: Mar. 8, 2022

Related U.S. Application Data

(63) Continuation of application No. 16/533,622, filed on Aug. 6, 2019, now Pat. No. 11,266,125.
(Continued)

(51) Int. Cl.
*G06Q 10/04* (2023.01)
*G06Q 10/0631* (2023.01)
(Continued)

(52) U.S. Cl.
CPC ............. *A01K 29/00* (2013.01); *G06Q 10/04* (2013.01); *A01K 5/02* (2013.01); *A23K 50/70* (2016.05); *G06Q 10/0631* (2013.01)

(58) Field of Classification Search
CPC .... G06Q 10/06; G06Q 10/04; G06Q 30/0283; G06Q 30/0201; G06Q 10/0635;
(Continued)

(56) References Cited

U.S. PATENT DOCUMENTS

| 5,668,718 A | 9/1997 | Liu et al. |
| 6,076,043 A | 6/2000 | Liu |

(Continued)

FOREIGN PATENT DOCUMENTS

| WO | WO-2006015061 A2 * | 2/2006 | ............... A01K 5/02 |
| WO | WO_2006113292 | 10/2006 | |

OTHER PUBLICATIONS

I. J. Rose, "Breeding Strategies to make Sheep Farms Resilient to Uncertainty." Order No. 28233962, Wageningen University and Research, Ann Arbor, 2014. (Year: 2014).*

(Continued)

*Primary Examiner* — Maria C Santos-Diaz
(74) *Attorney, Agent, or Firm* — Charles A. Lemaire; Lemaire Patent Law Firm, P.L.L.C.

(57) ABSTRACT

An apparatus and method for profit maximization and risk mitigation that uses nutrition modeling of animals, including poultry and marine animals, is a critical component of the respective enterprise optimization and managed environment pollution control. The optimization accuracy depends on the description of utilization efficiency of nutrients in a population of animals. Utilization efficiency of nutrients for meat production in a population is preferably based on at least three component parts of nutrient utilization, namely maintenance, linear gain, and non-linear gain, instead of one only. Efficiencies for maintenance and linear gain are fixed value(s), but nutrient efficiency is a result of intra-population variation and efficiency of linear gain, and affect profit. Similar processing is performed to obtain optimal crop growth and profit. Finally, one or both of the animal-growth optimization and the crop-growth optimization are combined with a profit-maximization and risk-mitigation processor to provide information for a decision maker.

20 Claims, 7 Drawing Sheets

Related U.S. Application Data

(60) Provisional application No. 62/715,084, filed on Aug. 6, 2018.

(51) Int. Cl.
*A01K 29/00* (2006.01)
*A01K 5/02* (2006.01)
*A23K 50/70* (2016.01)

(58) Field of Classification Search
CPC ......... G06Q 10/06375; G06Q 30/0206; A01K 29/005; A01K 2267/0356
See application file for complete search history.

(56) References Cited

U.S. PATENT DOCUMENTS

| | | | |
|---|---|---|---|
| 6,115,692 | A | 9/2000 | Liu et al. |
| 7,534,433 | B2 | 5/2009 | Pimentel |
| 7,553,504 | B2 | 6/2009 | Rigby et al. |
| 8,478,447 | B2 | 7/2013 | Fadell et al. |
| 8,594,850 | B1 | 11/2013 | Gourlay et al. |
| 8,642,262 | B2 | 2/2014 | Stroman et al. |
| 8,690,578 | B1 | 4/2014 | Nusbaum et al. |
| 8,788,448 | B2 | 7/2014 | Fadell et al. |
| 8,897,539 | B2 | 11/2014 | Stone et al. |
| 8,953,024 | B2 | 2/2015 | Wang et al. |
| 9,212,996 | B2 | 12/2015 | Watson et al. |
| 11,266,125 | B1 * | 3/2022 | Wala ................ A23K 50/75 |
| 2008/0172244 | A1 | 7/2008 | Coupal et al. |
| 2014/0067745 | A1 | 3/2014 | Avey et al. |
| 2020/0134486 | A1 * | 4/2020 | Jiang ................ G06N 5/04 |

OTHER PUBLICATIONS

Y. Lin, "System Level Economic Analysis of Swine Diet Modifications." Order No. 3202875, Oklahoma State University, Ann Arbor, 2005. (Year: 2005).*

M. P. L. Calus, "Estimation of Genotype x Environment Interaction for Yield, Health and Fertility in Dairy Cattle." Order No. 28238841, Wageningen University and Research, Ann Arbor, 2006. (Year: 2006).*

Jiang, X. (1999). Broiler breeding: Breeding goals, selection schemes and the usefulness of local breeds for china (Year: 1999).*

Colman, et al., "Caloric restriction reduces age-related and all-cause mortality in rhesus monkeys", "Nature Communications", Apr. 1, 2014, vol. 5: 3557.

Gompertz, "On the Nature of the Function Expressive of the Law of Human Mortality, and on a New Mode of Determining the Value of Life Contingencies", "Philos. Trans. Roy. Soc.", 1825, pp. 513-585.

Keyvanshokooh, et al., "Hybrid robust and stochastic optimization for closed-loop supply chain network design using accelerated benders decomposition.", "European Journal of Operational Research", Feb. 16, 2016, pp. 76-92, vol. 249, No. 1.

Kinyamu, "Energy metabolism of growing pigs", "Iowa State University Dissertation Submitted to the Graduate Faculty in Partial Fulfillment of the Requirements for the Degree of Doctor of Philosophy", 1990.

National Research Council, "Nutrient Requirements of Swine", "Tenth Revised Edition", 1998, Publisher: National Academy Press.

Ramsey, et al., "Dietary restriction and aging in rhesus monkeys: the University of Wisconsin study", "Exp Gerontol.", Dec. 2000, pp. 1131-1149, vol. 35, No. 9-10.

Tedeschi, et al., "Energy requirement for maintenance and growth of Nellore bulls and steers fed high-forage diets", "Journal of Animal Science", Jun. 2002, pp. 1671-1682, vol. 80.

Tedeschi, et al., "Developing a conceptual model of possible benefits of condensed tannins for ruminant production", Jul. 2014, pp. 1095-1105 , vol. 8, No. 7.

Tedeschi, et al., "The Utility of Applied Nutrition Models: A Brief History and Future Perspectives", "Texas A&M University https://www.nutritionmodels.com/documents/history_2014.pdf", Aug. 14, 2014, Publisher: https://animalscience.tamu.edu/the-utility-of-applied-nutrition-models-a-brief-history-and-future-perspectives/.

Tylutki, et al., "Cornell Net Carbohydrate and Protein System: A model for precision feeding of dairy cattle", "Animal Feed Science and Technology", May 2008, pp. 174-202, vol. 143, No. 1-4.

* cited by examiner

METHOD AND SYSTEM FOR ANIMAL GROWTH REGULATION FOR IMPROVED PROFITABILITY AND MITIGATED RISK

RELATED APPLICATIONS

This application is a continuation of U.S. patent application Ser. No. 16/533,622, filed Aug. 6, 2019 by Fazal Wala et al. and titled "System and method for animal growth regulation for improved profitability and mitigated risk" (which issued as U.S. Pat. No. 11,266,125 on Mar. 8, 2022), which claims priority benefit, under 35 U.S.C. § 119(e), of U.S. Provisional Patent Application 62/715,084, filed Aug. 6, 2018 by Fazal Wala et al. and titled "System and method for animal growth regulation for improved profitability and mitigated risk," each of which is incorporated herein by reference in its entirety.

This invention is related to U.S. Pat. No. 6,115,692, issued to Jinkui Liu et al. on Sep. 5, 2000 with the title "Generating growth alternatives," which is a continuation of U.S. Pat. No. 5,668,718, which is a continuation-in-part of U.S. application Ser. No. 08/289,652, filed Aug. 12, 1994, which is a continuation of U.S. application Ser. No. 08/125,409, filed on Sep. 22, 1993, and is also related to U.S. Pat. No. 6,076,043 issued to Jinkui Liu on Jun. 13, 2000 with the title "Utilization effectiveness of nutrients in a population," each of which is incorporated herein by reference in its entirety.

FIELD OF THE INVENTION

This invention relates to the field of agricultural product profit maximization conditioned to a given level of risk mitigation, and more specifically to an apparatus and method for generating optimized living entity and edible tissue growth alternatives and amounts, and generating an inter-variable and temporal relationships between tissue-growth factors of an animal in order to optimize edible tissue output production given inherent enterprise finance, resources, processing, and marketing constraints.

BACKGROUND OF THE INVENTION

The economic optimization and viability of an enterprise depends on the ability to accurately analyze the relationship between the cost of materials, services, and labor that are input into the enterprise and the return that is achieved on the product that is output by the enterprise. In agribusiness industries that raise animals such as livestock, poultry, marine animals, etc., the inputs include the animal itself, food, shelter, and services. The output, of course, is the marketable tissue components of the processed animal. One of the most critical relationships in optimizing the economic margins of an enterprise is the relationship between the controllable and uncontrollable factors that affect the rate at which the animal and its tissue components grow and the final size of the animal at marketing age. Thus, it is important to have a value-based food chain model that describes the relationship between each of these factors and the rate of growth of a population of animals.

Variables affecting the growth and yield of edible tissue of animals can be divided into genetic and non-genetic categories. Genetic variables are fixed and are reflected by the growth potential of the individual type of animal of interest. It will be appreciated by those skilled in the art that the growth rate of an animal is never higher and only lower than the maximum potential. During its life, an animal seeks to achieve its genetic potential, but fails due to the impediment of non-genetic variables.

Non-genetic variables that are partially controllable by the commercial operator can be divided further into living factors and food factors. Living factors encompass environmental conditions such as temperature, humidity, animal density, ventilation, disease conditions, air quality, etc. Food factors encompass the types and digested amounts of material that are ingested by an animal. In some embodiments, food factors are controlled in a commercial environment through nutrition. The food factor reflects a major portion of the cost during the growth period.

To maximize an enterprise's before tax net margin, many scientists have used models to simulate the growth of various types of animals. (See G. C. Emmans, "The Growth of Turkeys," 21 Recent Advances in Turkey Science, 135-166 (C. Nixey and T. C. Grey eds. 1989); H. Talpaz et al., "Dynamic Optimization Model for Feeding of Broilers," Agric. Sys, 121-132 (1986); H. Talpaz et al., "Economic Optimization of a Growth Trajectory for Broilers," 70 Amer. J. Ag. Econ., 382-390 (1988); P. E. Waibel et al., TURKS Program Agricultural Extension Service (University of Minnesota 1985)). It will be appreciated that the various models represent efforts to take into account the incredibly complex and diverse structure of living entities, as well as the innumerable variables that affect the living entities in their environment.

One model that is used to describe animal growth is the Gompertz curve (B. Gompertz, "On the Nature of the Function Expressive of the Law of Human Mortality, and on a New Mode of Determining the Value of Life Contingencies," Philos. Trans. Roy. Soc., 513-585 (1825)), which shows the current mass weight as a function of age with known constant parameters. Gompertz curves have been used to describe the growth of poultry only in terms of a singular factor or characteristic such as a genetic characteristic, a living condition, or a food factor (G. C. Emmans, "The Growth of Turkeys," 21 Recent Advances in Turkey Science, 135-166 (C. Nixey and T. C. Grey eds. 1989); R. M. Gous et al., "A Characterization of the Potential Growth Rate of Six Breeds of Commercial Broiler," 2 Proceedings of XIX World's Poultry Congress, 20-24 (Amsterdam, The Netherlands, September 1992); N. B. Anthony et al., "Comparison of Growth Curves of Weight Selected Populations of Turkeys, Quail and Chickens," 70 Poultry Sci., 13-19 (1991)). However, because all the parameters are independent from one to another among all the curves, each Gompertz curve can describe growth in terms of only one set of conditions.

Because of the complexity of a life form, there is a need for a model that describes growth alternatives in terms of a plurality of different conditions. Such a model would permit an accurate economic analysis that allows a commercial operator to simultaneously (non-repetitive) optimize the relationship between the conditions and growth. In turn, the production of living animals would be more easily controlled in order to optimize production and hence maximize economic return.

U.S. Pat. No. 6,076,043 issued to Jinkui Liu on Jun. 13, 2000 with the title "Utilization effectiveness of nutrients in a population" and is incorporated herein in its entirety by reference. U.S. Pat. No. 6,076,043 describes nutrition modeling of animal, poultry and marine animals is a critical component of the respective enterprise optimization and managed environment pollution control. The optimization accuracy depends on the description of utilization efficiency of nutrients in a population of animals. The current invention demonstrates that utilization efficiency of nutrients for meat production in a population should be described based on at least three component parts of nutrient utilization, i.e., maintenance, linear gain, and non-linear gain, instead of one only. Efficiencies for maintenance and linear gain are fixed value(s), but nutrient efficiency for non-linear gain is a result of intra-population variation and efficiency of linear gain.

U.S. Pat. No. 5,668,718 to Liu et al. issued Sep. 16, 1997 with the title "Generating growth alternatives" and is incorporated herein in its entirety by reference. U.S. Pat. No. 5,668,718 describes an apparatus and method for determining when a living animal reaches its optimum rate of growth. This information is then used to calculate the optimal parameters for achieving the maximum Return on Investment (ROI). The computer determines the optimal number of birds for a flock, type and amount of feed, length of time between hatching and sale to food processor, etc. The computer consists of a microprocessor, random access memory, a storage device, a keyboard, a computer screen, a printer, a math co-processor.

What is needed is improved agricultural decision-assisting software including live audio-video interactions with experts who may be called to assist in use of the software and in making decisions, wherein the software automatically acts to maximize profit and return on investment, while limiting risk to a chosen level.

SUMMARY OF THE INVENTION

In some embodiments, the present invention uses the apparatus and method that builds on the teaching of U.S. Pat. Nos. 6,115,692, 6,076,043 and 5,668,718, by further including financial, market-demand, insurance, weather, genetics, and risk-mitigation models and the like to maximize expected profit while operating to limit risk to a chosen level.

One advantage of the present invention is that it is based on the correlation between constant parameters among a multitude of Gompertz curves, each describing the growth of an animal given a predetermined characteristic. Thus, a commercial poultry operator can use the apparatus and method of the present invention to simultaneously optimize growth and yield in a plurality of living and food conditions in order to maximize economic return.

The present invention generally relates to a modeling method and operating a computer that computes the time trajectory that a bird can reach its optimum rate of growth with age. Using this information, the computer can simultaneously determine an appropriate size for a flock of birds, the type and amount of feed that should be fed to the flock, and the age at which a flock should be sold to a food processor, in order to maximize the profits realized by a commercial integrator who raises or subcontracts meat production.

More specifically, the present invention is an apparatus for optimizing the ratio between expenditures and rate of growth for living animals. This apparatus includes processing means for optimizing the ratio between expenditures and the rate of growth for animals, wherein the processing optimum rate of growth according to the equation $W = A \exp(-\exp(-k(t-t^*)))$, where W is the current body weight of the animal, A is the weight of the animal at physical maturity, k is a growth rate factor, t is the current age of the animal, and $t^*$ is the age at which the animal has its maximum rate of growth, $t^*$ and k being statistically related.

The apparatus also includes memory means for storing data corresponding to information about feed, information about the characteristics of the animals, and information generated by the processing means. The memory means is operationally coupled to the means calculates the optimum rate of growth with age at which the animals can experience their processing means.

The present invention is also in the form of a method for operating the apparatus. The method steps include calculating the time trajectory at which the animal can experience its optimum rate of growth with age according to the equation $W = A \exp(-\exp(-k(t-t^*)))$, where W is the current body weight of the animal, A is the weight of the animal at physical maturity, k is a growth rate factor, t is the current age of the animal, and $t^*$ is the age at which the animal has its maximum rate of growth, $t^*$ and k being statistically related. The method includes the additional step of storing data corresponding to information about feed, information about the characteristics of the animals, and information generated by the processing means.

These and other advantages and capabilities, which characterize the present invention, are pointed out with particularity in the claims annexed hereof and forming a further part hereof. However, for a better understanding of the invention, its advantages, and objects obtained by its use, reference should be made to the drawings, which form a further part hereto, and to the accompanying descriptive matter, which illustrates and describes a preferred embodiment of the present invention.

In some embodiments, the software includes detection algorithms that automatically act to detect and reduce risk.

In some embodiments, the software includes optimization algorithms that automatically act to maximize expected profit while keeping the entire operation within a chosen level of risk.

The present invention provides an apparatus and method for profit maximization and risk mitigation that uses nutrition modeling of animal, poultry and marine animals is a critical component of the respective enterprise optimization and managed environment pollution control. The optimization accuracy depends on the description of utilization efficiency of nutrients in a population of animals. Utilization efficiency of nutrients for meat production in a population are preferably based on at least three component parts of nutrient utilization, i.e., maintenance, linear gain, and non-linear gain, instead of one only. Efficiencies for maintenance and linear gain are fixed value(s), but nutrient efficiency for non-linear gain is a result of intra-population variation and efficiency of linear gain. Similar processing is performed to obtain optimal crop growth and profit. Finally, one or both of the animal-growth optimization and the crop-growth optimization are combined with a profit maximization and risk mitigation processor to provide information for a decision maker.

DETAILED DESCRIPTION OF FIGURES

Although the following detailed description contains many specifics for the purpose of illustration, a person of ordinary skill in the art will appreciate that many variations and alterations to the following details are within the scope of the invention. Specific examples are used to illustrate particular embodiments; however, the invention described in the claims is not intended to be limited to only these examples, but rather includes the full scope of the attached claims. Accordingly, the following preferred embodiments of the invention are set forth without any loss of generality to, and without imposing limitations upon the claimed invention. Further, in the following detailed description of the preferred embodiments, reference is made to the accompanying drawings that form a part hereof, and in which are shown by way of illustration specific embodiments in which the invention may be practiced. It is understood that other embodiments may be utilized and structural changes may be made without departing from the scope of the present invention. The embodiments shown in the Figures and described here may include features that are not included in all specific embodiments. A particular embodiment may include only a subset of all of the features described, or a particular embodiment may include all of the features described.

The leading digit(s) of reference numbers appearing in the Figures generally corresponds to the Figure number in which that component is first introduced, such that the same reference number is used throughout to refer to an identical component which appears in multiple Figures. Signals and connections may be referred to by the same reference number or label, and the actual meaning will be clear from its use in the context of the description.

Preferably, in some embodiments, the computer of the present invention is programmed using a suitable database that is distributed such that many competing users can maintain the confidentiality of their own data and with individual parts securely updated across the internet, while at the same time aggregating an overall anonymized database that can assist all users in their individual decisions without collusion or conspiring to fix prices. In some embodiments, any suitable database software packages such as Paradox, DB2, Access, etc., may be used, and the computer may also be programmed using Visual Basic, C, Fortran, Pascal or other suitable programming languages. During execution of the program, the microprocessor system sequentially executes a series of individual instructions in each of one or more parallel-operation processors. However, as described herein, the operation of the microprocessor implementing the program will be defined in terms of major functional steps.

Figure 1A:
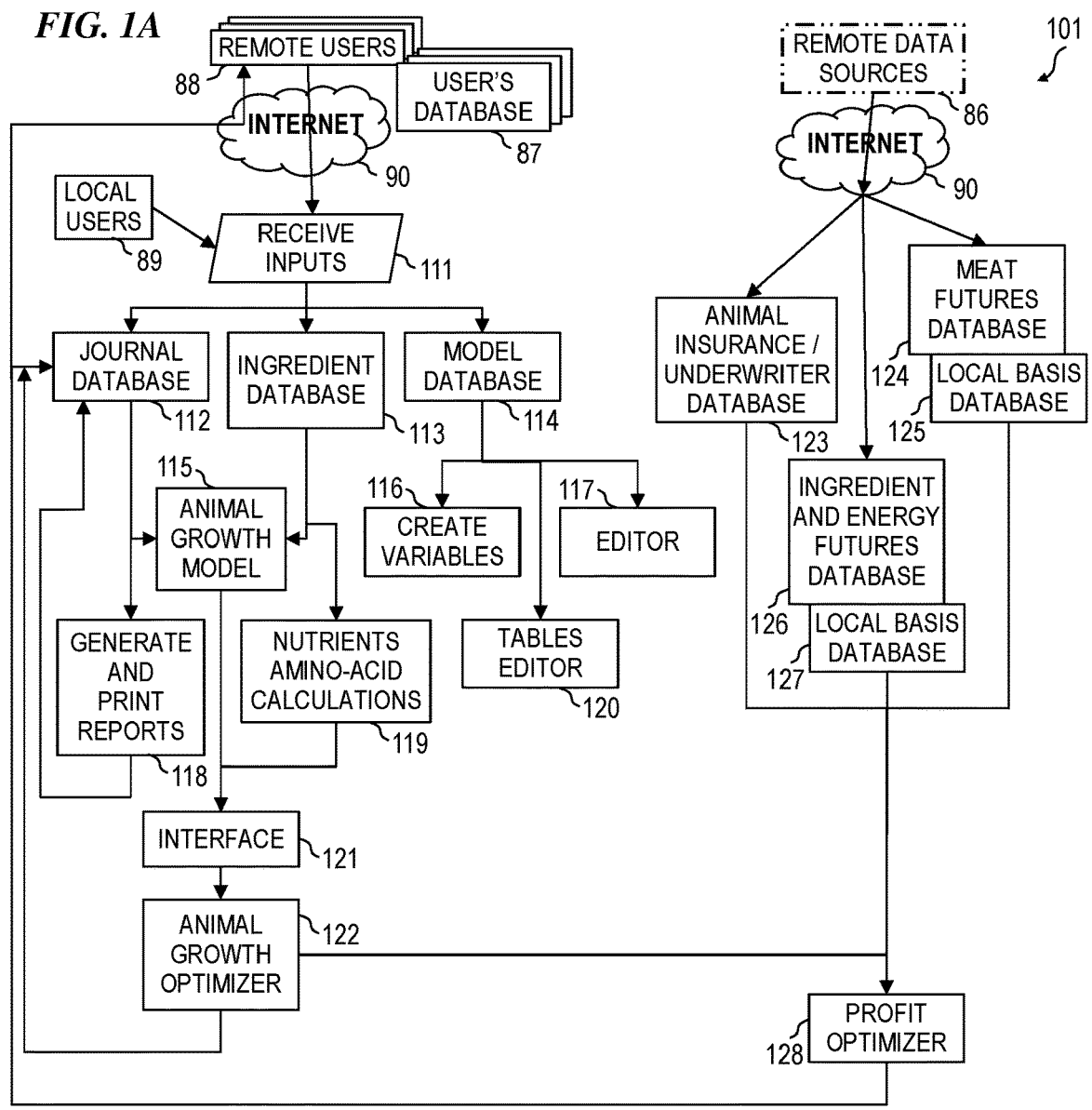
FIG. 1A is a block diagram of an animal-profit maximizing system 101, according to some embodiments of the present invention.

FIG. 1A is a block diagram of an animal-profit maximizing system 101, according to some embodiments of the present invention. In some embodiments, system 101 is largely implemented by software programs that run on server computer 110 of FIG. 1. In some embodiments, the remote users 88 and/or local user(s) 89 input information via block 111 (in which in some embodiments, the computer system 104 provides a secured and encrypted password-protected browser interface that elicits and receives information from the user 99 or the user's computer 88 or other source having an internet connection) that is put into the databases (as additions, updates or modifications to journal database 112, ingredient database 113, and model database 114). In some embodiments, the remote users can maintain and use private user-specific databases 87 to supplement or replace the system journal database 112, ingredient database 113, and/or model database 114. The information received by input block 111 (which is typically inputted by a user via keyboard, USB thumb-size FLASH drive, and/or spreadsheet) is entered into the journal database 112, ingredient database 113, and/or model database 114. The journal database 112, stores information that relates to the characteristics of the flock or herd such as sex, weight, number, strain, etc. This journal database 112 also stores the information that is generated by the model 115 and the optimizer 122. Such journal database 112 information relates to the optimal diet, environmental conditions, flock size, predicted mortality rate, predicted yield, financial figures, etc. The ingredient database 113, stores information that relates to the potential ingredients that may be included within the feed and the nutritional values of the various ingredients. In some embodiments, ingredient database 113 also includes equations that the users 99, via users' computers 88 and/or 89 can cause to execute to recalculate the value of the amino-acid nutrients and metabolizable energy for each day or stage of the animal's life. In some embodiments, these equations are based on the weight per bushel and the protein content of the ingredients. The model database 114, includes information (e.g., equations) that are used in the actual code of the execution files. The model database 114 also includes information that relates to the variables that are used within the execution files.

In some embodiments, the blocks 118, 115, 119, 116, 117, and 120 represent the various execution programs that are required to control the computer of the present invention. In some embodiments, these blocks implement function described in U.S. Pat. Nos. 6,115,692, 6,076,043 and 5,668,718, which are incorporated herein by reference. In some embodiments, any one of these blocks may contain a plurality of execution files in order to fulfill its function. As described above, in some embodiments, the execution files and the databases are written utilizing the Clarion™ database software or other suitable database software.

The animal-growth model 115 allows the user to execute the model that forms the equations that are described in the section below titled "*A. Theory*." That section also forms equations that calculate the predicted mortality rate and other effects of living conditions, predicted yield for various economic body parts, and nutrient calculations. More specifically, the model creates a plurality of simultaneous equations that it will pass through the interface 121 to the animal-growth optimizer 122.

The interface 121 reconfigures the information generated by the animal-growth model 115 into a form that is acceptable by the animal-growth optimizer 122. In some embodiments, optimizer 122 includes a non-linear simultaneous equations optimizer, which are well known in the art.

The animal-growth optimizer 122 will solve the simultaneous equations in order to create the optimal values for each of the variables that describe the predicted mortality rate and other effects of living conditions, predicted yield for various economic body parts, and nutrient calculations. In some embodiments, the animal-growth optimizer 122 provides data that provides the highest growth rate and earliest date for marketable animals ready for the processing plant. This information is then passed from animal-growth optimizer 122 to the journal database 112, where it is stored.

In some embodiments, data is also passed from animal-growth optimizer 122 to the animal profit optimizer 128, which also takes into account data collected from remote data sources 86 (including public data such as from the U.S. Department of Agriculture, public universities and the like, insurance and underwriting company data, and private purchased data from such sources as Agri Stats, Inc. at www.agristats.com and the like) using internet connections 90. This collected data is placed into one or more databases such as animal insurance/underwriter database 123, meat futures database 124 (optionally including a local-basis database 125 of price variations in one or more local markets) and/or ingredient-futures and energy-futures (optionally including cost-of-capital, cost of labor, and/or cost of automation information) database 126 (optionally including a local-basis database 127 of price variations in one or more local markets). In some embodiments, profit optimizer 128 performs hundreds or thousands of repeated runs of most or all the information using different variations of input deltas (such as lengthening or shortening the growth period before the animals are harvested, changing the space per animal (does the benefit to animal health and meat production outweigh the cost of additional housing space, and what is the optimal space per animal that provides the best profit given a set amount of risk, and what other factors (such as heat, humidity, light, ventilation, manure control and the like), provide the best environment for the animals), in order to find the most and best local maximums, in order to find the overall maximum given constraints on the business.

Block 118 is the portion wherein the user may execute the files that generate and print reports. These reports are described in detail below. In some embodiments, the user 99 edits, using tables editor 120, the tables that store information about the various ingredients that may be included in feed in Nutrients amino-acid calculations 119. More specifically, the user may delete or add ingredients, and edit the nutritional values associated with each ingredient. Additionally, the user may execute amino acid and energy equations that recalculates the values of the amino acid and metabolizable energy nutrients based on the weight per bushel and protein content of each ingredient. The information manipulated by 119 is stored in the ingredient database 113.

In some embodiments, the user is helped to create variables that are used in the various execution files in create variables 116. In some embodiments, at tables editor 120 the user may create and edit the various electronic data tables (EDTs) that are used to organize and store information within the databases. Finally, in some embodiments, the user creates and edits the execution files and databases at editor 117.

Figure 1D:
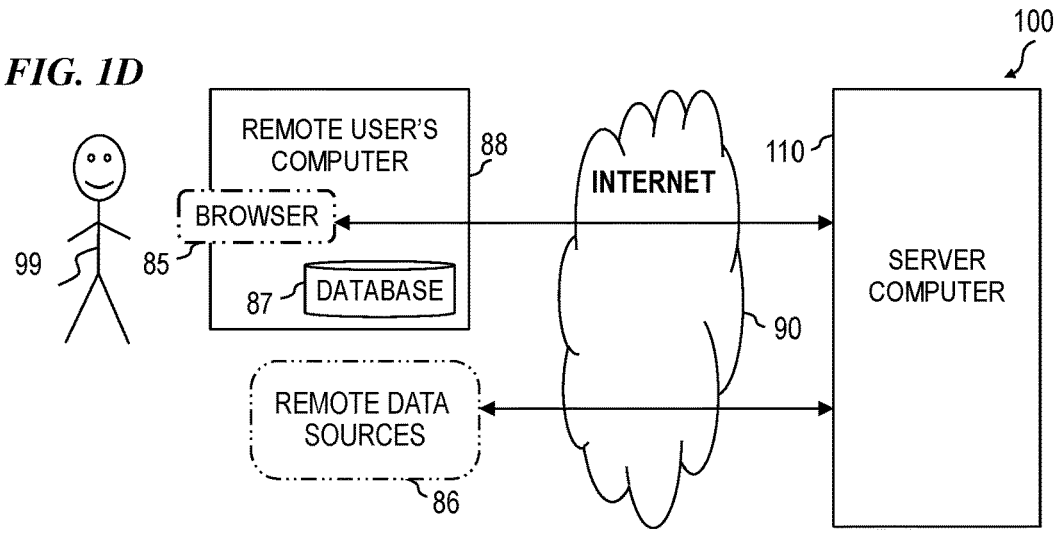
FIG. 1D is a block diagram of a computer system 104, according to some embodiments of the present invention.
Figure 1B:
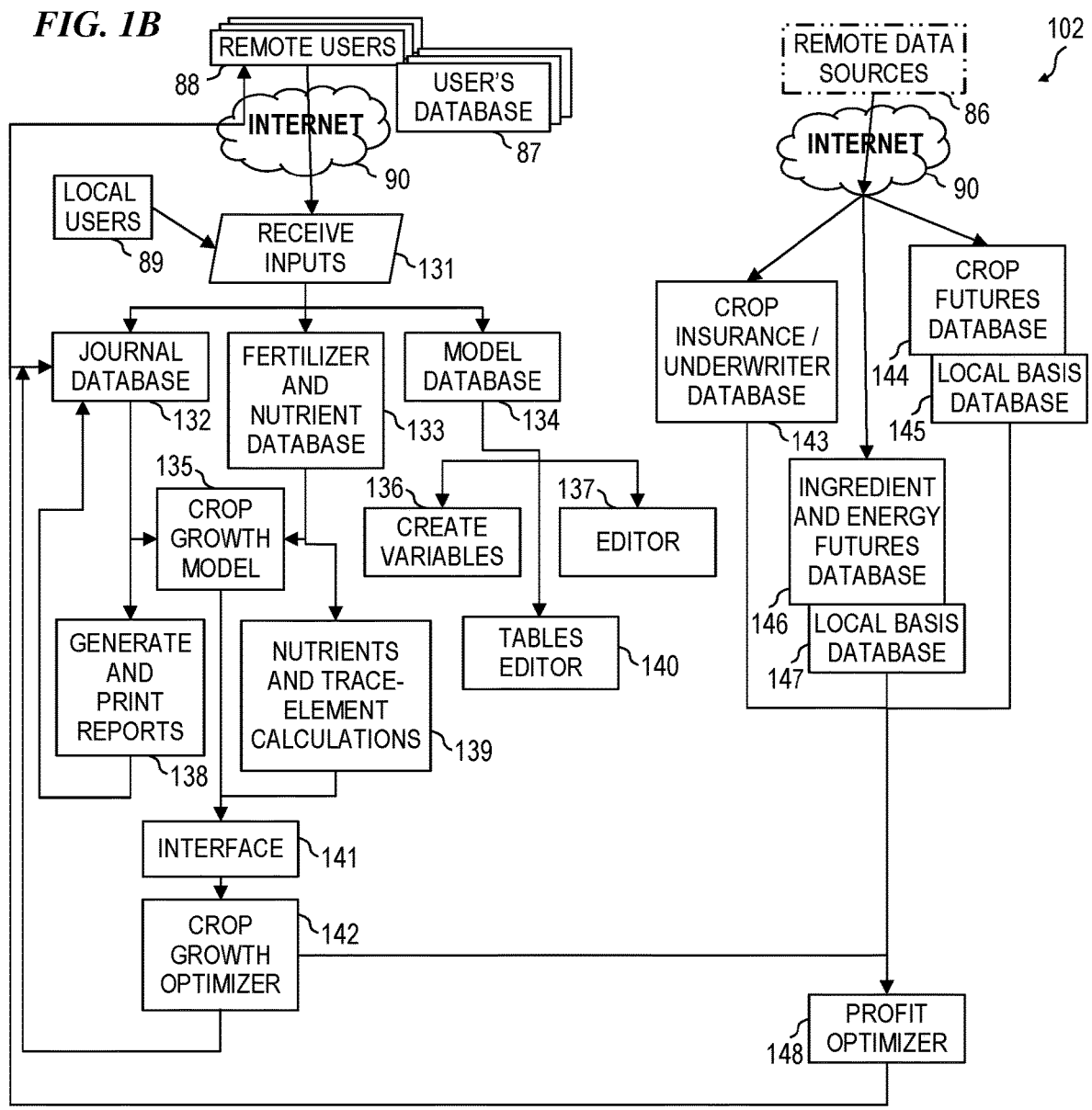
FIG. 1B is a block diagram of a crop-profit maximizing system 102, according to some embodiments of the present invention.

FIG. 1B is a block diagram of a crop-profit maximizing system 102, according to some embodiments of the present invention. In some embodiments, system 102 is largely implemented by software programs that run on server computer 110 of FIG. 1. In some embodiments, the remote users 88 and/or local user(s) 89 input information via block 131 (in which in some embodiments, the computer system 104 provides a secured and encrypted password-protected browser interface that elicits and receives information from the user 99 or the user's computer 88 or other source having an internet connection) that is put into the databases (as additions, updates or modifications to journal database 132, fertilizer, mineral and nutrient database 133, and model database 134). In some embodiments, the remote users can maintain and use private user-specific databases 87 to supplement or replace the system journal database 132, ingredient database 133, and/or model database 134. The information received by input block 131 (which is typically inputted by a user via keyboard, USB thumb-size FLASH drive, and/or spreadsheet) is entered into the journal database 132, fertilizer, mineral and nutrient database 133, and/or model database 134. The journal database 132, stores information that relates to the characteristics of the crop such as genetics, resistances to various diseases and pests, water needs and drought tolerance, salt tolerance, and the like. This journal database 132 also stores the information that is generated by the model 135 and the crop-growth optimizer 142. Such journal database 132 information relates to the optimal diet, environmental conditions, flock size, predicted mortality rate, predicted yield, financial figures, etc. The ingredient database 133, stores information that relates to the potential ingredients that may be included within the feed and the nutritional values of the various ingredients. In some embodiments, fertilizer, mineral and nutrient database 133 also includes equations that the users 99, via users' computers 88 and/or 89 can cause to execute to recalculate the value of trace nutrients and water needs for each day or stage of the crop's life cycle. In some embodiments, these equations are based on the weight and content of the fertilizer, mineral and nutrient ingredients. The model database 134, includes information (e.g., equations) that are used in the actual code of the execution files. The model database 134 also includes information that relates to the variables that are used within the execution files.

In some embodiments, blocks 138, 135, 139, 136, 137, and 140 represent the various execution programs that are required to control the computer of the present invention. In some embodiments, these blocks implement function described in U.S. Pat. Nos. 6,115,692, 6,076,043 and 5,668,718, which are incorporated herein by reference. In some embodiments, any one of these blocks may contain a plurality of execution files in order to fulfill its function.

The crop-growth model 135 allows the user to execute the model that forms the equations that are similar to those described in the section below titled "A. Theory." That section also forms equations that calculate the predicted mortality rate and other effects of living conditions, predicted yield for various economic body parts, and nutrient calculations. More specifically, the model creates a plurality of simultaneous equations that it will pass through the interface 141 to the crop growth optimizer 142.

The interface 141 reconfigures the information generated by the crop-growth model 135 into a form that is acceptable by the crop-growth optimizer 142. In some embodiments, crop-growth optimizer 142 includes a non-linear simultaneous equations optimizer, which are well known in the art.

The crop-growth optimizer 142 will solve the simultaneous equations in order to create the optimal values for each of the variables that describe the predicted loss in case of drought and other effects of growing conditions, predicted yield for various economic plant parts, and nutrient calculations. In some embodiments, the crop-growth optimizer 142 provides data that provides the highest growth rate and earliest date for marketable animals ready for the processing plant. This information is then passed from crop-growth optimizer 142 to the journal database 132, where it is stored.

In some embodiments, data is also passed from crop-growth optimizer 142 to the crop-profit optimizer 148, which also takes into account data collected from remote data sources 86 (including public data such as from the U.S. Department of Agriculture, public universities and the like, insurance and underwriting company data, and private purchased data from such sources as Agri Stats, Inc. at www.agristats.com and the like) using internet connections 90. This collected data is placed into one or more databases such as animal insurance/underwriter database 143, crop futures database 144 (optionally including a local-basis database 145 of price variations in one or more local markets) and/or ingredient-futures and energy-futures (optionally including cost-of-capital, cost of labor, and/or cost of automation information) database 146 (optionally including a local-basis database 147 of price variations in one or more local markets). In some embodiments, crop-profit optimizer 148 performs hundreds or thousands of repeated runs of most or all the information using different variations of input deltas (such as lengthening or shortening the growth period before the animals are harvested, changing the space per animal (Does the benefit to animal health and meat production outweigh the cost of additional housing space? What is the optimal space per animal that provides the best profit given a set amount of risk? What other factors (such as heat, humidity, light, ventilation, manure control and the like), provide the best environment for the animals?), in order to find the most and best local maximums, in order to find the overall maximum given constraints on the business.

Block 138 is the portion wherein the user may execute the files that generate and print reports. These reports are described in detail below. In some embodiments, the user 99 edits, using tables editor 140, the tables that store information about the various ingredients that may be included in feed in Nutrients amino-acid calculations 139. More specifically, the user may delete or add ingredients, and edit the nutritional values associated with each ingredient. Additionally, the user may execute amino acid and energy equations that recalculate the values of the amino acid and metabolizable energy nutrients based on the weight per bushel and protein content of each ingredient. The information manipulated by 139 is stored in the fertilizer, mineral and nutrient ingredient database 133.

In some embodiments, the user is helped to create variables that are used in the various execution files in create variables 136. In some embodiments, at tables editor 140 the user 99 may create and edit the various electronic data tables (EDTs) that are used to organize and store information within the databases. Finally, in some embodiments, the user creates and edits the execution files and databases at editor 137.

Figure 1C:
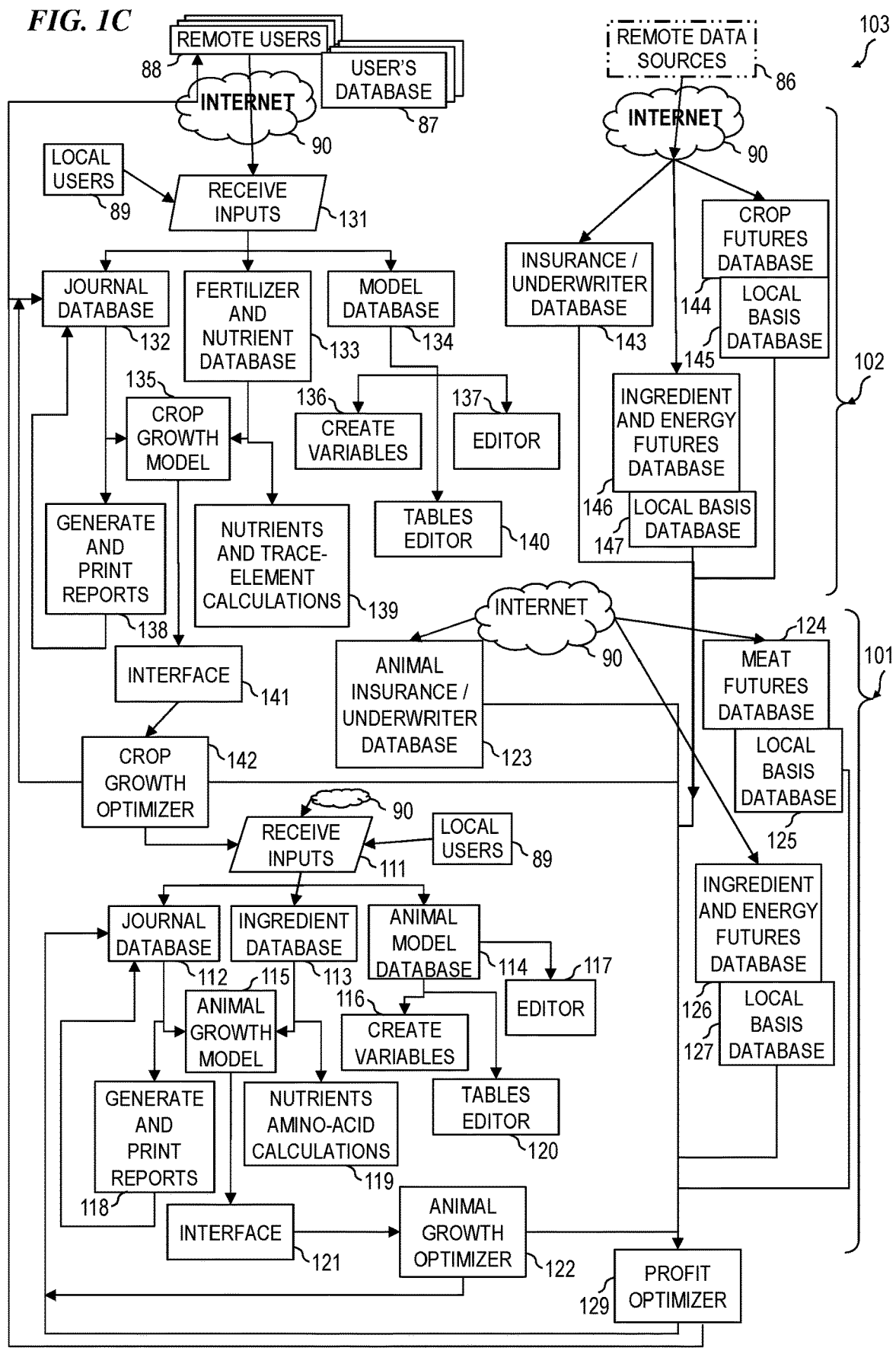
FIG. 1C is a block diagram of a crop-and-animal-profit maximizing system 103, according to some embodiments of the present invention.

FIG. 1C is a block diagram of a crop-and-animal-profit maximizing system 103, according to some embodiments of the present invention. In some embodiments, crop-and-animal-profit maximizing system 103 combines animal-profit maximizing system 101 of FIG. 1A and crop-profit maximizing system 102, and combines and enhances the animal-profit optimizer 128 and crop-profit optimizer 148, in order to further optimize the overall combined profit using non-linear simultaneous-equations optimizer 129.

FIG. 1D is a block diagram of a computer system 104, according to some embodiments of the present invention. In some embodiments, computer system 104 includes a server computer 110 that connects across the internet 90 to a remote user's computer 88 that includes a local database 87 and a browser 85. In some embodiments, a human user 99 is a decision maker who needs a relevant presentation of data on which human user 99 is able to make better decisions to maximize profits given the level of risk the user is prepared or permitted to take on. The human user 99 controls which data from their local database 87 is sent to the server computer 110 (data such as space per animal, the genetic breed of the animal, local weather data and price of ingredients in the animal's diet. In some embodiments, using well-known algorithms, the data provided from database 87 and from browser interface 85 is encrypted by the remote user's computer 88 before being transmitted to server computer 110 where it is decrypted sufficiently to be used in calculations, and the result data is encrypted by server computer 110 before being transmitted back, and that result data is decrypted by the remote user's computer 88 for presentation to user 99. In addition, data is presented from the server computer 110 that the human user 99 can act upon to mitigate and control risk.

Figure 2:
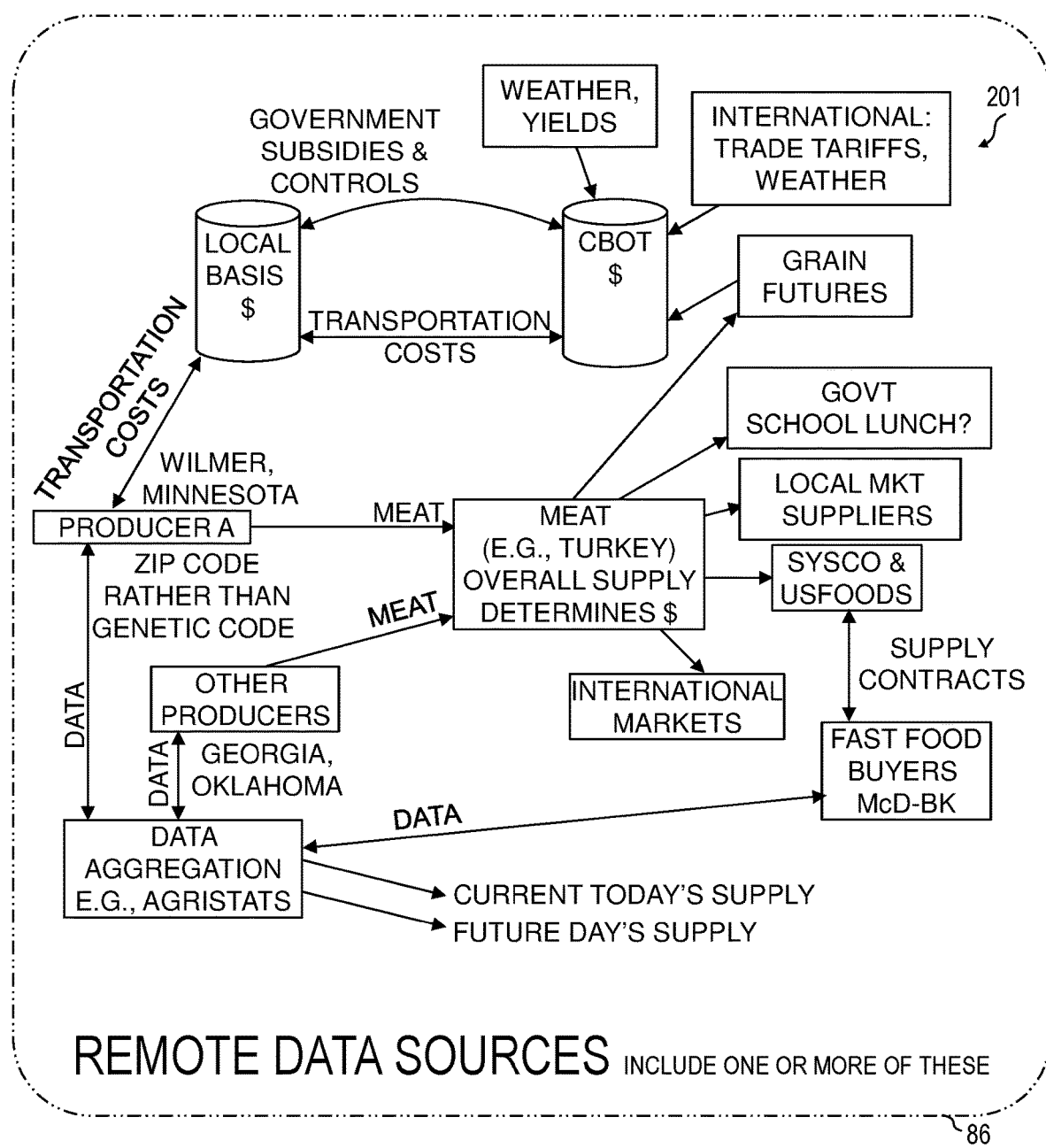
FIG. 2 is a block diagram of interacting data sources 201 that together form remote data sources 86 shown in FIG. 1A, FIG. 1B, and FIG. 1C.

FIG. 2 is a block diagram of interacting data sources 201 that together form remote data sources 86 shown in FIG. 1A, FIG. 1B, and FIG. 1C. In some embodiments, it is most important to classify the data as to the source location (e.g., the ZIP code) rather than on the breed of animal (the genetic code) when gathering data for profit maximization. This is at least in part because the local weather, climate, humidity and the like have a larger effect on profit results than does the breed of poultry.

Figure 3:
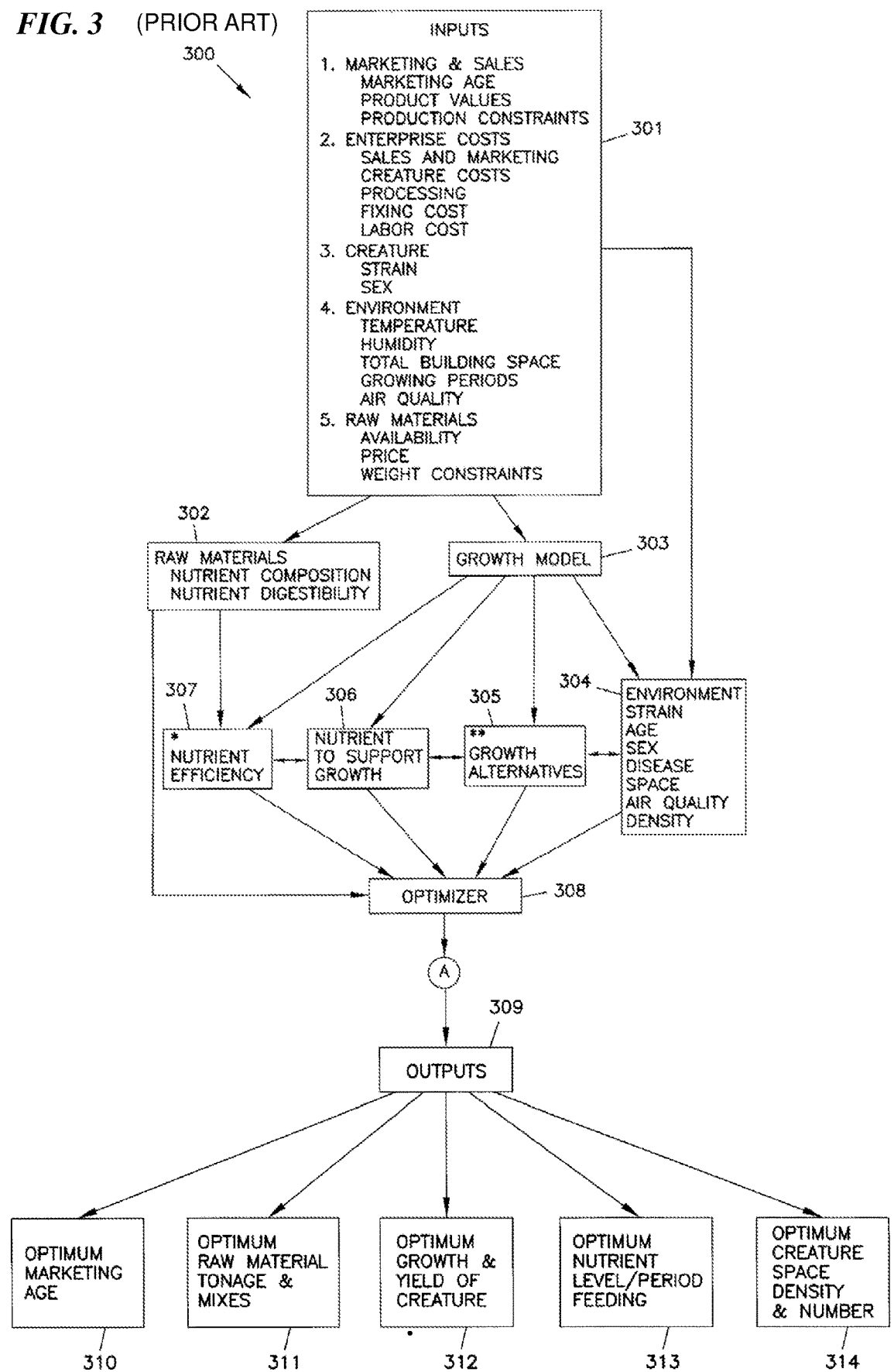
FIG. 3 is a prior-art flow chart of method 300, used in some embodiments of the present invention.

FIG. 3 is a prior-art flow chart of method 300 showing the program execution from U.S. Pat. No. 6,115,692 (FIGS. 21a and 21b of U.S. Pat. No. 6,115,692), which is incorporated herein by reference. Block 301 illustrates the various inputs into the logical program flow in order to calculate and solve the various equations. Block 302 includes information on nutrient composition and digestibility which may be stored in the form of a look-up table or some other known database structure. This data is provided to block 307 where data and/or equations on the nutrient efficiency is stored. Additional information is provided to block 307 from the growth model block 303 and the nutrient to support growth block 306. Each of the various blocks 302, 307, 306, 305, and 304 provide data and equations to optimizer block 308 which solves the equations in an optimized manner. The outputs of optimizer block 308 are provided to output block 309 which provides the results to the journal database 204 (best seen in FIG. 4 (FIG. 20 of U.S. Pat. No. 6,115,692)). This information is illustrated as including: optimum marketing age, block 310; optimum raw material tonnage and mixes, block 311; optimum growth & yield of animals, block 312; optimum nutrient level/period feeding, block 313; and optimum animal space density & number, block 314.

Figure 4:
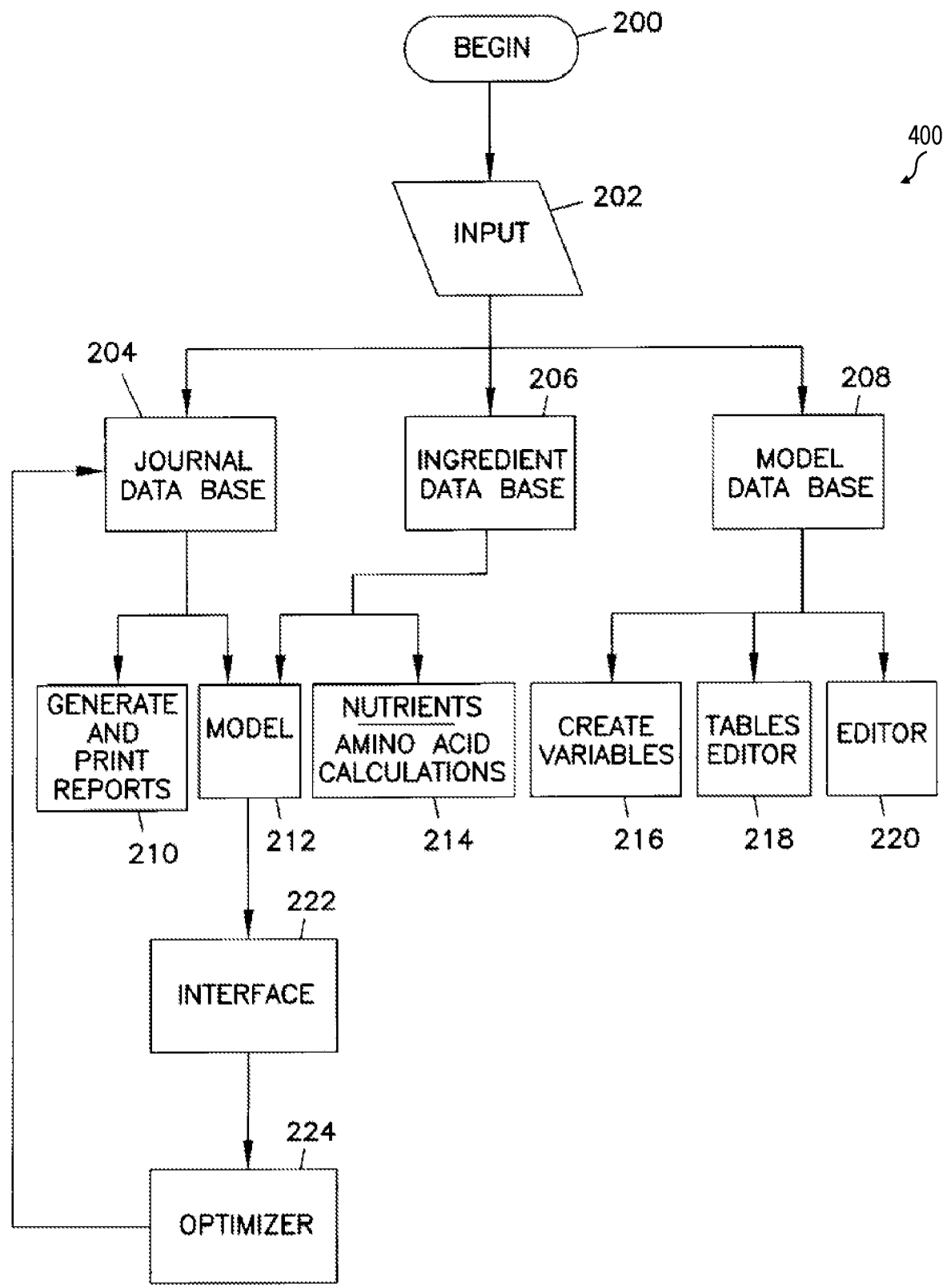
FIG. 4 is a prior-art flow chart of method 400, used in some embodiments of the present invention.

FIG. 4 is a prior-art flow chart of method 400 showing the program execution from U.S. Pat. No. 6,115,692 (FIG. 20 of U.S. Pat. No. 6,115,692), which is incorporated herein by reference, used in some embodiments of the present invention. In some embodiments, a program that controls the computer of the present invention begins at block 200. In some embodiments, a user inputs information into the databases at Block 202. The information inputted may enter either the Journal database 204, Ingredient database 206, or Model database 208. The Journal database, block 204 stores information that relates to the characteristics of the flock such as sex, weight, number, strain, etc. This database also stores the information that is generated by the model and the optimizer. Such information relates to the optimal diet, environmental conditions, flock size, predicted mortality rate, predicted yield, financial figures, etc. The Ingredient database, block 206, stores information that relates to the potential ingredients that may be included within the feed and the nutritional values of the various ingredients. One skilled in the art will realize that the Ingredient database also includes equations that the user can execute to recalculate the value of the amino acid nutrients and metabolized energy. These equations are based on the weight per bushel and protein content of the ingredients. The Model database, block 208, includes information that relates to the actual code of the execution files. The model database also includes information that relates to the variables that are used within the execution files.

One skilled in the art will realize that the blocks 210, 212, 214, 216, 218, and 220 represent the various execution programs that are required, in some embodiments, for program execution. Each of these blocks may contain a plurality of execution files in order to fulfill its function. The source code for the model is described in U.S. Pat. No. 6,076,043 titled "Utilization effectiveness of nutrients in a population," which is incorporated herein by reference. As described above, in some embodiments, the execution files and the databases are preferably written utilizing the Clarion™ database software.

At block 212, in some embodiments, the user causes execution of the model that forms the equations that are described in described in U.S. Pat. No. 6,076,043 titled "Utilization effectiveness of nutrients in a population," which is incorporated herein by reference. U.S. Pat. No. 6,076,043 titled "Utilization effectiveness of nutrients in a population," which is incorporated herein by reference This section also forms equations that calculate the predicted mortality rate and other effects of living conditions, predicted yield for various economic body parts, and nutrient calculations. More specifically, the model will create a plurality of simultaneous equations that it will pass through the interface, block 222, to the Optimizer, block 224.

The interface, Block 222, reconfigures the information generated by the Model, Block 212, into a form that is acceptable by the Optimizer. In some embodiments, the interface is written in C++. In some embodiments, the Optimizer is a non-linear optimizer, which are well known in the art.

In some embodiments, the Optimizer, Block 224, solves the simultaneous equations in order to create the optimal values for each of the variable that describe the predicted mortality rate and other effects of living conditions, predicted yield for various economic body parts, and nutrient calculations. This information is then passed to the Journal database, Block 204, where it is stored.

At block 210, in some embodiments, the user causes execution of the files that generate and print reports. These reports are described in U.S. Pat. No. 6,115,692, titled "Generating growth alternatives," which is incorporated herein by reference. At block 214, the user may edit the tables that store information that about the various ingredients that may be included in feed. More specifically, the user may delete or add ingredients, and edit the nutritional values associated with each ingredient. Additionally, the user may execute amino acid and energy equations that recalculates the values of the amino acid and metabolizable nutrients based on the weight per bushel and protein content of each ingredient. The information manipulated by block 214, is stored in the Ingredient database, block 206.

At block 216, in some embodiments, the user creates variables used in the various execution files. One skilled in the art will realize that at block 218 the user may create and edit the various tables that are used to organize and store information within the databases. Finally, the user may create and edit the execution files and databases at block 220.

For an egg or broiler enterprise, there are multiple input variables that affect profit and loss (the bottom line):
  Nutrition in feed: energy input e.g., whether based on corn
    or soybeans or animal proteins
    proteins lysine, arginine, methionine
    vitamins E, D, A, K
    Minerals Calcium, Phosphorus
  Genetics: Strain of the animals
  Sex of bird
  Housing for animals: building cost: energy (heat/cooling),
    space,
    ventilation (remove ammonia), lighting
    bird kilograms per meter$^2$ floor quality, manure-removal slots,
    cages or open,
  Labor persons or automation, shifts per day
  cost of money interest, who invests
  processing plant In some embodiments, the present invention correlates equations that describe the multitude of Gompertz curves for various variables that describe the growth of living animals. The results of the correlation allow an animal processor to simultaneously optimize the ratio between expenditures and growth and thus optimize profit margins. In other words, the growth rate of the animal is substantially optimized when the market value of the animal and the cost incurred from raising the animal maximizes the before tax net margin associated with raising the animal or population of animals.

Additionally, the variable can describe both genetic and non-genetic characteristics or factors involved with modeling the growth of the animals or the population of animals. The non-genetic variables are substantially at their optimal values when the net margin is maximized. Some examples of non-genetic characteristics that are described by the non-genetic variable include body weight, population density, nutrient composition of the feed, temperature, and humidity.

In various embodiments, the present invention is used for any type of animal whose growth can be described by a Gompertz curve. However, for purposes of description, the present invention is described in the context of poultry.

"A. Theory"

Figure 5:
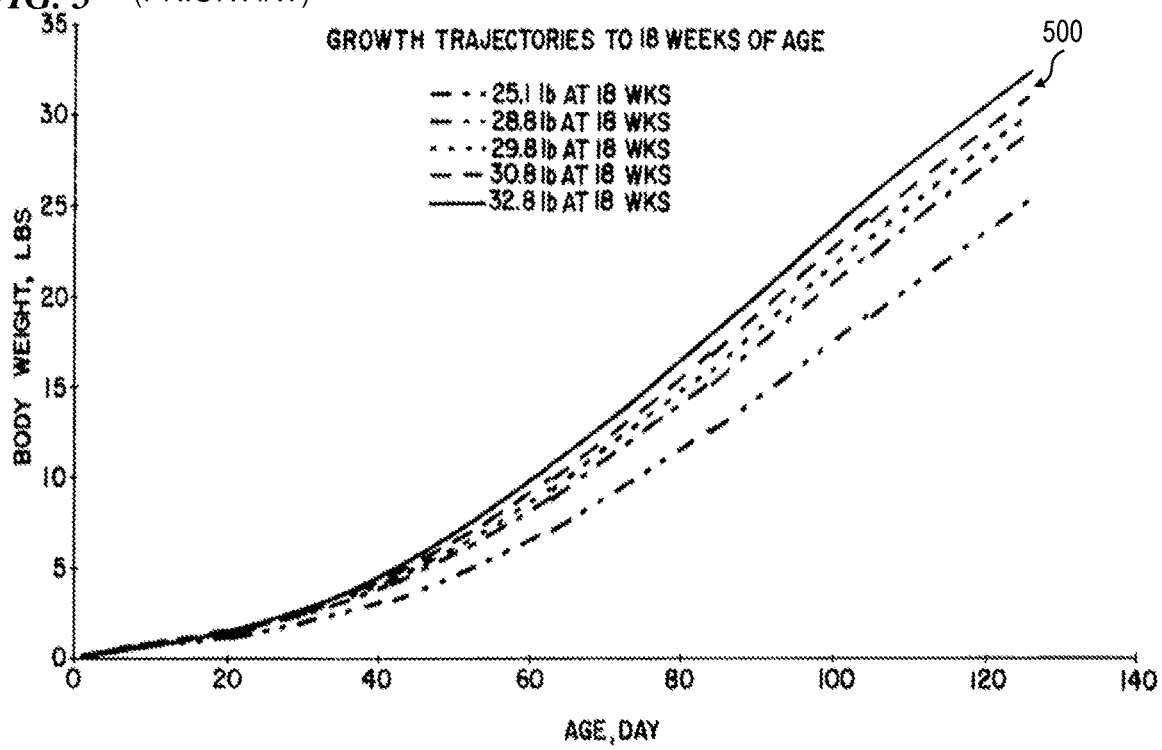
FIG. 5 is a prior-art graph 500 showing the growth alternatives described by a Gompertz curve.

FIG. 5 is a prior-art graph 500 (FIG. 1 of U.S. Pat. No. 6,115,692, titled "Generating growth alternatives," which is incorporated herein by reference), showing the growth alternatives described by a Gompertz curve.

Figure 6:
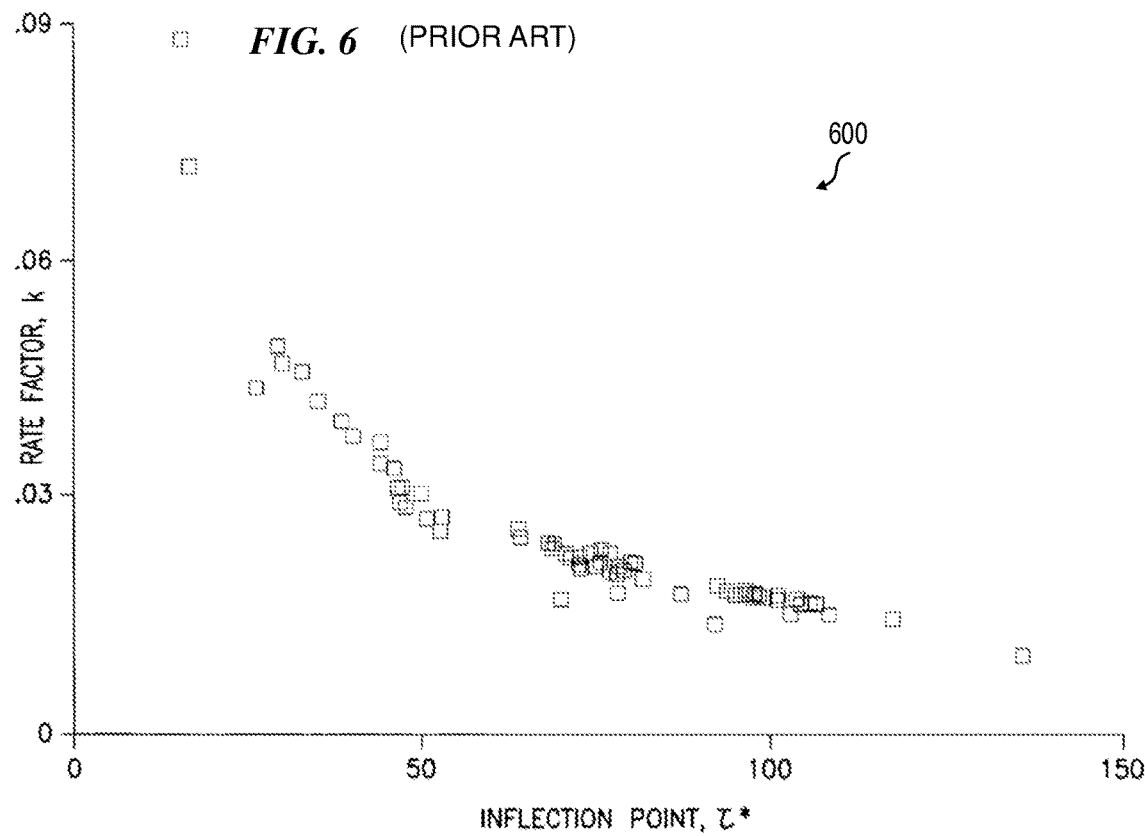
FIG. 6 is a prior-art graph 600 showing the relationship between the rate factor, k, and the inflection point, t.

FIG. 6 is a prior-art graph 600 (FIG. 3 of U.S. Pat. No. 6,115,692, titled "Generating growth alternatives," which is incorporated herein by reference), showing the relationship between the rate factor, k, and the inflection point, t.

As described in U.S. Pat. Nos. 6,115,692, 6,076,043 and 5,668,718, a Gompertz curve represents mass as a function of time, and is commonly used to represent the growth of poultry. The Gompertz curve that describes a growth pattern in Laird form is as follows:

$$W = W_0 \exp(L/k)(1-\exp(-kt)) \tag{1}$$

where W is the current body weight, $W_0$ is the initial body weight, exp( ) is the number e (the root of the natural logarithm; about 2.718281828) raised to the power of the argument in the parentheses, L is a constant, k is a constant, t is the current age of the bird, and represents an exponent. (Laird, A. K. 1966. Postnatal growth of birds and mammals. Growth 30:349-363) Equation (1) can be rearranged as follows:

$$W=f(t)=W_0 \exp((L/k)\exp((-L/k)\exp(-kt))). \quad (2)$$

The limit of equation (2) as t→∞ is defined as:

$$\lim f(t)=A=W_0 \exp(L/k) \quad (3)$$

where A is the bird's mature body weight. Combining equation (2) and equation (3) results in the following equation:

$$W=A \exp((-L/k)\exp(-kt)), \quad (4)$$

which can be written as follows:

$$W=Au \quad (5)$$

$$\text{where } u=\exp((-L/k)\exp(-kt)). \quad (6)$$

Equation (4) can be rewritten as:

$$W=A \exp(-B \exp(-kt)) \quad (7)$$

where $B=L/k$.

From equation (7), the average daily gain is:

$$f'(t)=WkB \exp(-kt). \quad (8)$$

The rate at which the average daily gain changes is defined as:

$$f''(t)=k^2 BW \exp(-kt)(B \exp(-kt)-1) \quad (9)$$

If $f''(t)=0$ at the age of maximum gain, then:

$$0=k^2 BW \exp(-kt^*)(B \exp(-kt^*)-1)B \exp(-kt^*)$$
$$=1B=\exp(kt^*) \quad (10)$$

where $t^*$ is defined as the inflection point, which represents the age at which the maximum daily weight gain is achieved.

The constants $t^*$ and k govern the form of growth curve. If equation (10) is substituted into equation (7), then $$W=Au \quad (11)$$

Where $u=\exp(-\exp(-k(t-t^*)))$. Equation (11) shows that current body weight depends on mature weight A and u. Mature weight A is a genetically inherited value. Given fixed genetic conditions, the form of growth trajectory depends on u, i.e., the growth rate factor k and inflection point $t^*$. Therefore, living conditions affect the form of growth trajectory through the parameters $t^*$ and k. The growth trajectory represents body weight over age.

Rate factor k and inflection point $t^*$ are independent of each other among multiple growth curves even though they are constrained by equation (10) within one curve. Due to the simultaneous impact of living conditions, the two parameters of equation (11) cannot be used to optimize growth by optimizing parameter k and $t^*$ independently. Independent optimization of parameter k and/or $t^*$ may result in faulty combinations of the two parameters in terms of describing animal growth. Their inter-relationship among different curves has to be established in order to make equation (11) cover multiple curves so that it can be used in an automated computer optimization process, i.e., either make constant k a function of the inflection point $t^*$ so that $k=f(t^*)$ or make $t^*$ a function of k so that $t^*=f(k)$.

The equations that are utilized in the program of the present invention are:

$$W=A \exp(-\exp(-k(t-f(k))) \quad (12)$$

which can be rewritten as:

$$W=A \exp(-\exp(-f(t^*)(t-t^*)). \quad (13)$$

For simplicity, Equation (13) will be used for explanation.

When mature weight A and age t is known, only one variable $t^*$ is left to predict body weight W in equation (13). The difference between equation (11) and equation (13) is that equation (11) represents only one growth curve and $t^*$ is a constant. However, equation (13) represents multiple curves wherein $t^*$ is a variable that can be optimized in an optimization process. Therefore, the relationship between k and $t^*$ must be defined. This relationship will be in the form of a function $k=f(t^*)$.

Experimental growth data for broilers, quails, and turkeys with different genetic and environmental conditions have been obtained from public domain sources and summarized. This information is contained within the program of the present invention and can be used to define the relationship between k and $t^*$.

The body weight for male turkeys of age 0 to 18 weeks (Waibel, P. E., "Pelleting, fat, and protein levels in turkey diets." 67 Proc. of Maryland Nutrition Conference for Feed Manufactures, March 16-17, (1989)) and female turkeys of age 0 to 18 weeks (Waibel, P. E. et al., "Factorial Study of Protein Level Sequence and Diet Energy/Pelleting on Performance of Large White Hen Turkeys," 68 reported in Poultry science Association Annual Meeting, University of Wisconsin, Madison. July 24-28 (1989)) are each comprised of 24 different protein sequence treatments. The body weights of each treatment at different ages was independently fitted into equation (11) and the corresponding value for k and $t^*$ was calculated. More specifically, constant k and $t^*$ were experimentally determined by (See Hurwitz, S. et al., "Estimation of the Energy Needs of Young Broiler Chicks," Proceedings of the Meeting, Arkansas Nutrition Conference 16-21 (Riverfront Hilton, North Little Rock, Ark., Sep. 10-12, 1991); Talpaz, H. et al., "Dynamic Optimization Model for Feeding of Broilers," Agaric. Says, 121-132 (1986); Talpaz, H. et al., "Modeling of Dynamics of Accelerated Growth Following Feed Restriction in Chicks," 36 Agric. Sys., 125-135 (1991); Gous, R. M. et al., "A Characterization of the Potential Growth Rate of Six Breeds of Commercial Broiler," 2 Proceedings of XIX World's Poultry Congress, 20-24 (Amsterdam, The Netherlands, September 1992); Emmans, G. C., "The Growth of Turkeys," 21 Recent Advances in Turkey Science, 135-166 (C. Nixey and T. C. Grey eds. 1989); Anthony, N. B. et al., "Comparison of Growth Curves of Weight Selected Populations of Turkeys, Quail and Chickens," 70 Poultry Sci., 13-19 (1991)) and fitted into equation (11) by mathematical methods that are commonly known in the art. The values of B and L are calculated using equation (10). It is helpful to graph k plotted against $t^*$. In some embodiments, such a graph demonstrates the relationship of $k=f(t^*)$ and that the relationship between k and $t^*$ is non-linear. In some embodiments, the graph shows that statistical methods demonstrate that $k=0.79878t^*(-0.83747)$, where adjusted correlation coefficient $r=0.9746$.

Equation (13) can be rewritten as $$W=A \exp(-\exp(-(0.79878t^*(-0.83747)(t-t^*)))). \quad (14)$$

This equation covers a multitude of growth-curve possibilities and can be used for different types of poultry including turkey, broiler, duck, quail, etc. Given equation (13), constant $t^*$ is the only variable to be affected by various living conditions.

Equations (12) and (13) reveal that the rate at which a bird grows depends on only one variable—$t^*$ or k. As discussed above, $t^*$ is the age at which a bird has its maximum rate of gain and k is a growth-rate factor. The earlier the age, the quicker the bird will grow to the weight at which it may be marketed. The commercial applications of equation (12) or (13) will be very important tools in selecting the most efficiently growing genotype of bird and in genetic breeding. in some embodiments, the present invention has applications related to the production of other types of animals as well as vegetation.

Equation (13) can be utilized in optimizing poultry production because it correlates multiple growth curves, which include a genetic potential growth curve of the type shown in FIG. 5 (FIG. 1 of U.S. Pat. No. 6,115,692, titled "Generating growth alternatives," which is incorporated herein by reference). A curve of this type is required in order to implement a computer optimization process. As discussed above, the genetic potential growth curve of FIG. 5 defines the minimum age at which a bird's maximum growth rate is reached. Given the curve of FIG. 6 (FIG. 3 of U.S. Pat. No. 6,115,692, titled "Generating growth alternatives"), a computer can calculate optimum weight gain and average body weight for each feeding period of a flock of birds. The weight gain and average body weight is then used to determine the optimal living and food environments. The following example shows how the potential weight gain can be modified by changing the density of turkeys within a certain living space.

Change of weight gain=0.71556+7.9902 MDNSITY− 57.765 MDNSITY2 where r (correlation coefficient)= 0.8846; overall p-value (possibility value)=0.0006; and MDNSITY-body weight density ranged 0.03 to 0.06 meter2/ kg 0.67. Similar predictions can be derived by establishing the effect of temperature, humidity, ventilation, etc. on weight gain.

In addition to predicting physical mass of the entire bird, the inflection point $t^*$ can be used to predict the growth of each component part of a bird's body. The following is an example for turkeys:

Breast (% of Eviscerated carcass)=67.121−2.2824 Sex+ 0.37094 Age−0.00093294 Age2−93116 ln(Age)− 0.14238 $t^*$ where r=0.843; and p-value of coefficient $t^*$=0.0000.

Thigh (% of Eviscerated carcass)=14.6+0.056919 Age− 0.00022113 Age2−0.026625 $t^*$ where r=0.875; and p-value of coefficient $t^*$=0.0000.

Wing (% of Eviscerated carcass)=26.399−2.3552 Sex+ 0.10141 Age−0.0018162 Age2+0.0000064398 Age3− 0.10284 $t^*$ where r=0.90; p-value of coefficient $t^*$=0.0000.

Neck (% of Eviscerated carcass)=18.056−2.1653 Sex− 0.0095747 Age−0.085037 $t^*$ where r=0.6367; and p-value of coefficient $t^*$=0.0000 where Sex—1 for male, 2 for female; age=age in days; $t^*$=inflection point (days); r=correlation coefficient; and p-value=possibility value.

All the above regression equations show that the inflection point $t^*$ has a significant effect on dependent variables as indicated by the small number of p-values.

In some embodiments, the report that is generated includes values for the maximum profit that is achieved at each one of a plurality of values of the level of risk taken to achieve the corresponding maximized profit, and then lists the values for each of the variables of flock size, sex, strain, and each of the nutrition variables used to formulate the animal feed, space per animal, ventilation and the like needed to obtain the maximum profit at each of the levels of risk. In some embodiments, a plurality of three-dimensional (3D) curves are graphed and output for the human decision maker, wherein each 3D graph shows the expected maximized profit (e.g., on a Z-dimension) for each pair of values for two variables each representing an important factor relating to risk. In some embodiments, the software of the present invention determines which factors have the highest effect on risk, and the sets of 3D graphs of profit are selected to demonstrate how profit shifts based on which risk factors are addressed by hedging and/or insurance, so that the human decision maker can more easily choose a level of risk to take and the expected profit (and/or a curve representing a range of expected possible profit values) that is/are likely to result.

In some embodiments, the present invention provides a computerized apparatus that includes: a first server system operably connected to the internet; software executing on first server system that elicits and receives into the first server system information based on characteristics of the flock or herd including sex, weight, number, and strain; software executing on first server system that elicits and receives into the first server system information including optimal diet, environmental conditions, flock size, predicted mortality rate, predicted yield, and financial figures; software executing on first server system that elicits and receives into the first server system information including type of feed and nutritional values of various ingredients thereof; and software executing on first server system that varies selected values for each of flock size, sex, weight, number, strain, optimal diet, environmental conditions, predicted yield, and financial figures and, for each of a plurality of combinations of the selected varied values, calculates an expected profit in order to maximize profit for a predetermined amount of risk.

In some embodiments, the present invention provides a computerized method that includes: providing a first server system operably connected to the internet; eliciting and receiving into the first server system information based on characteristics of the flock or herd including sex, weight, number, and strain; eliciting and receiving into the first server system information including optimal diet, environmental conditions, flock size, predicted mortality rate, predicted yield, and financial figures; eliciting and receiving into the first server system information including type of feed and nutritional values of various ingredients thereof; and varying selected values for each of flock size, sex, weight, number, strain, optimal diet, environmental conditions, predicted yield, and financial figures and, for each of a plurality of combinations of the selected varied values, calculating an expected profit in order to maximize profit for a predetermined amount of risk.

In some embodiments, the present invention provides a computerized apparatus that includes: a first server system operably connected to the internet; means for eliciting and receiving into the first server system information based on characteristics of the flock or herd including sex, weight, number, and strain; means for eliciting and receiving into the first server system information including optimal diet, environmental conditions, flock size, predicted mortality rate, predicted yield, and financial figures; means for eliciting and receiving into the first server system information including type of feed and nutritional values of various ingredients thereof; and means for varying selected values for each of flock size, sex, weight, number, strain, optimal diet, environmental conditions, predicted yield, and financial figures and, means, for each of a plurality of combinations of the selected varied values, for calculating an expected profit in order to maximize profit for a predetermined amount of risk.

In some embodiments, the present invention provides a computerized non-volatile computer-readable medium having instructions stored thereon that when executed by a suitably programed first server system operably connected to the internet, performs a method that includes: eliciting and receiving into the first server system information based on characteristics of the flock or herd including sex, weight, number, and strain; eliciting and receiving into the first server system information including optimal diet, environmental conditions, flock size, predicted mortality rate, predicted yield, and financial figures; eliciting and receiving into the first server system information including type of feed and nutritional values of various ingredients thereof; and varying selected values for each of flock size, sex, weight, number, strain, optimal diet, environmental conditions, predicted yield, and financial figures and, for each of a plurality of combinations of the selected varied values, calculating an expected profit in order to maximize profit for a predetermined amount of risk.

In some embodiments, the present invention provides a computerized apparatus that includes: a first server system operably connected to the internet; software executing on first server system that elicits and receives into the first server system information based on characteristics of a flock of animals including number of each sex, weight, and strain; software executing on first server system that elicits and receives into the first server system information including optimal diet, environmental conditions, flock size, predicted mortality rate, predicted yield, and financial figures from the internet; software executing on first server system that elicits and receives into the first server system information including type of feed and nutritional values of various ingredients thereof; and software executing on first server system that stores values for each one of a plurality of levels of risk including a value for a first level of risk, and varies selected values for each of number of each sex, weight, strain, optimal diet, environmental conditions, predicted yield, and financial figures and, for each of a plurality of combinations of the selected varied values, calculates an expected profit for each of a plurality of the varied selected values in order to maximize profit for the first level of risk.

In some embodiments of the apparatus, the animals are chicken birds being raised for broilers, wherein the software executing on first server system optimizes a ratio between expenditures and rate of growth the birds according to equation $W=A \exp(-\exp(-k(t-t^*)))$, where W is a current body weight of the birds, A is a weight of the birds at physical maturity, k is a growth rate factor, t is a current age of the birds, and $t^*$ is an age at which the birds have a maximum rate of growth, and wherein $t^*$ and k are statistically related.

In some embodiments of the apparatus, the software executing on first server system calculates an expected profit for each of a plurality of the varied selected values in order to maximize profit for each one of the plurality of levels of risk; and wherein the software outputs a curve of likelihoods of profit values over a range of profit levels for each of the plurality of risk levels.

In some embodiments of the apparatus, the animals are chicken birds being raised for broilers, wherein the software executing on first server system calculates a bird-weight-versus-time trajectory that an average bird of the sex and strain reaches its optimum rate-of-growth versus age and uses this information to simultaneously determine an appropriate size for the flock of birds, the type and amount of feed that should be fed to the flock, and the age at which a flock should be sold to a food processor, in order to maximize the profits realized by a commercial integrator who subcontracts meat production.

In some embodiments of the apparatus, the financial figures used to maximize profit include a cost of transportation and a cost of feed storage at each of a plurality of future moments in time.

In some embodiments of the apparatus, the financial figures used to maximize profit include a cost of borrowing money and a cost of insurance against loss.

In some embodiments, the present invention provides a computerized method that includes: providing a first server system operably connected to the internet; eliciting and receiving into the first server system information based on characteristics of a flock of animals including number of each sex, weight, and strain; eliciting and receiving into the first server system information including optimal diet, environmental conditions, flock size, predicted mortality rate, predicted yield, and financial figures from the internet; eliciting and receiving into the first server system information including type of feed and nutritional values of various ingredients thereof; storing values in the first server system for each one of a plurality of levels of risk including a value for a first level of risk; and varying selected values for each of number of each sex, weight, strain, optimal diet, environmental conditions, predicted yield, and financial figures and, for each of a plurality of combinations of the selected varied values, calculates an expected profit for each of a plurality of the varied selected values in order to maximize profit for the first level of risk.

In some embodiments of the method, the animals are chicken birds being raised for broilers, the computerized method further including optimizing a ratio between expenditures and rate of growth the birds according to equation $W=A \exp(-\exp(-k(t-t^*)))$, where W is a current body weight of the birds, A is a weight of the birds at physical maturity, k is a growth rate factor, t is a current age of the birds, and $t^*$ is an age at which the birds have a maximum rate of growth, and wherein $t^*$ and k are statistically related.

In some embodiments of the method, the animals are chicken birds being raised for broilers, and the computerized method further includes: calculating an expected profit for each of a plurality of the varied selected values in order to maximize profit for each one of the plurality of levels of risk; and outputting a curve of likelihoods of profit values over a range of profit levels for each of the plurality of risk levels.

In some embodiments of the method, the animals are chicken birds being raised for broilers, and the computerized method further includes: calculating a bird-weight-versus-time trajectory that an average bird of the sex and strain reaches its optimum rate-of-growth versus age and uses this information to simultaneously determine an appropriate size for the flock of birds, the type and amount of feed that should be fed to the flock, and the age at which a flock should be sold to a food processor, in order to maximize the profits realized by a commercial integrator who subcontracts meat production.

In some embodiments of the method, the financial figures used to maximize profit include a cost of transportation and a cost of feed storage at each of a plurality of future moments in time.

In some embodiments of the method, the financial figures used to maximize profit include a cost of borrowing money and a cost of insurance against loss.

In some embodiments of the method, the varying of selected values includes varying values of future predicted market-demand to maximize expected profit while operating to limit risk to a chosen level selected from the plurality of levels of risk.

In some embodiments of the method, the varying of selected values includes varying values of future predicted risk-mitigation costs to maximize expected profit while operating to limit risk to a chosen level selected from the plurality of levels of risk.

In some embodiments, the present invention provides non-volatile computer-readable medium having instructions stored thereon that when executed by a suitably programed first server system operably connected to the internet, performs a method that includes: eliciting and receiving into the first server system information based on characteristics of a flock of animals including number of each sex, weight, and strain; eliciting and receiving into the first server system information including optimal diet, environmental conditions, flock size, predicted mortality rate, predicted yield, and financial figures from the internet; eliciting and receiving into the first server system information including type of feed and nutritional values of various ingredients thereof; storing values in the first server system for each one of a plurality of levels of risk including a value for a first level of risk; and varying selected values for each of number of each sex, weight, strain, optimal diet, environmental conditions, predicted yield, and financial figures and, for each of a plurality of combinations of the selected varied values, calculates an expected profit for each of a plurality of the varied selected values in order to maximize profit for the first level of risk.

In some embodiments, the animals are chicken birds being raised for broilers, and the medium has instructions stored thereon such that the method further includes optimizing a ratio between expenditures and rate of growth the birds according to equation $W=A \exp(-\exp(-k(t-t^*)))$, where W is a current body weight of the birds, A is a weight of the birds at physical maturity, k is a growth rate factor, t is a current age of the birds, and $t^*$ is an age at which the birds have a maximum rate of growth, and wherein $t^*$ and k are statistically related.

In some embodiments, the animals are chicken birds being raised for broilers, and the medium has instructions stored thereon such that the method further includes calculating an expected profit for each of a plurality of the varied selected values in order to maximize profit for each one of the plurality of levels of risk; and outputting a curve of likelihoods of profit values over a range of profit levels for each of the plurality of risk levels.

In some embodiments, the animals are chicken birds being raised for broilers, and the medium has instructions stored thereon such that the method further includes calculating a bird-weight-versus-time trajectory that an average bird of the sex and strain reaches its optimum rate-of-growth versus age and uses this information to simultaneously determine an appropriate size for the flock of birds, the type and amount of feed that should be fed to the flock, and the age at which a flock should be sold to a food processor, in order to maximize the profits realized by a commercial integrator who subcontracts meat production.

In some embodiments of the medium, the financial figures used to maximize profit include a cost of transportation and a cost of feed storage at each of a plurality of future moments in time.

In some embodiments of the medium, the financial figures used to maximize profit include a cost of borrowing money and a cost of insurance against loss.

While the invention and method have been described in conjunction with a specific embodiment thereof, it is evident that different alternatives, modifications, and variations will be apparent to those skilled in the art in view of the foregoing description. Accordingly, the invention is not limited to these embodiments or the use of elements having specific configurations as presented herein.

It is to be understood that the above description is intended to be illustrative, and not restrictive. Although numerous characteristics and advantages of various embodiments as described herein have been set forth in the foregoing description, together with details of the structure and function of various embodiments, many other embodiments and changes to details will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein," respectively. Moreover, the terms "first," "second," and "third," etc., are used merely as labels, and are not intended to impose numerical requirements on their objects.

What is claimed is:

1. A computerized apparatus comprising:
   a first server system operably connected to the internet, the first server system comprising a microprocessor and software instructions to:
   elicit and receive into the first server system information based on characteristics of a group of animals including number of each sex, weight, age, and strain;
   elicit and receive into the first server system information including optimal diet, environmental conditions, group size, predicted mortality rate, predicted yield, and financial figures from the internet;
   elicit and receive into the first server system information including type of feed and nutritional values of various ingredients thereof;
   store different risk-level values for each one of a plurality of levels of risk including a risk-level value for a first level of risk;
   vary selected values for each of sex, weight, strain, optimal diet, environmental conditions, predicted yield, marketing age, and financial figures; and
   calculate an expected profit conditioned to each one of the plurality of risk-level values by varying each of the varied selected values in order to maximize profit conditioned to the first level of risk for each of a plurality of combinations of the varied selected values.

2. The apparatus of claim 1, wherein the animals are livestock, wherein the software executing on first server system optimizes a ratio between expenditures and rate of growth the livestock according to equation $W=A \exp(-\exp(-k(t-t^*)))$, where W is a current body weight of the livestock, A is a weight of the livestock at physical maturity, k is a growth rate factor, t is a current age of the turkeys, and $t^*$ is an age at which the livestock have a maximum rate of growth, and wherein $t^*$ and k are statistically related.

3. The apparatus of claim 1, wherein the software executing on first server system calculates an expected profit for each of a plurality of the varied selected values in order to maximize profit for each one of the plurality of levels of risk; and wherein the software outputs a curve of likelihoods of profit values over a range of profit levels for each of the plurality of risk levels.

4. The apparatus of claim 1, wherein the animals are turkeys, wherein the software executing on first server system calculates a turkey-weight-versus-time trajectory that an average turkey of the sex and strain reaches its optimum rate-of-growth versus age and uses this information to simultaneously determine an appropriate size for the turkeys, the type and amount of feed that should be fed to the group of animals, and the age at which the group should be sold to a food processor, in order to maximize profits realized by a commercial integrator who subcontracts meat production.

5. The apparatus of claim 1, wherein the financial figures used to maximize profit include a cost of transportation and a cost of feed storage at each of a plurality of future moments in time.

6. The apparatus of claim 1, wherein the financial figures used to maximize profit include a cost of borrowing money and a cost of insurance against loss.

7. A computerized method comprising:
  providing a first server system operably connected to the internet, the first server system comprising a microprocessor and software instructions;
  eliciting and receiving into the first server system information based on characteristics of a group of animals including number of each sex, weight, age, and strain;
  eliciting and receiving into the first server system information including optimal diet, environmental conditions, group size, predicted mortality rate, predicted yield, and financial figures from the internet;
  eliciting and receiving into the first server system information including type of feed and nutritional values of various ingredients thereof;
  storing a plurality of different risk-level values in the first server system for each one of a plurality of levels of risk including a risk-level value for a first level of risk;
  varying selected values for each of sex, weight, strain, optimal diet,
  environmental conditions, predicted yield, marketing age, and financial figures and, for each of a plurality of combinations of the selected varied values; and
  calculating an expected profit conditioned to each one of the stored plurality of different risk-level values while using each of a plurality of the varied selected values in order to maximize profit conditioned to the first level of risk.

8. The computerized method of claim 7, wherein the animals are turkeys, the computerized method further including optimizing a ratio between expenditures and rate of growth the turkeys according to equation $W=A \exp(-\exp(-k(t-t^*)))$, where W is a current body weight of the turkeys, A is a weight of the turkeys at physical maturity, k is a growth rate factor, t is a current age of the turkeys, and $t^*$ is an age at which the turkeys have a maximum rate of growth, and wherein $t^*$ and k are statistically related.

9. The computerized method of claim 7, wherein the animals are turkeys, the computerized method further including:
  calculating an expected profit for each of a plurality of the varied selected values in order to maximize profit for each one of the plurality of levels of risk; and
  outputting a curve of likelihoods of profit values over a range of profit levels for each of the plurality of risk levels.

10. The computerized method of claim 7, wherein the animals are turkeys, the computerized method further including:
  calculating a turkey-weight-versus-time trajectory that an average turkey of the sex and strain reaches its optimum rate-of-growth versus age and uses this information to simultaneously determine an appropriate size for the turkeys, the type and amount of feed that should be fed to the turkeys, and the age at which the turkeys should be sold to a food processor, in order to maximize profits realized by a commercial integrator who subcontracts meat production.

11. The computerized method of claim 7, wherein the financial figures used to maximize profit include a cost of transportation and a cost of feed storage at each of a plurality of future moments in time.

12. The computerized method of claim 7, wherein the financial figures used to maximize profit include a cost of borrowing money and a cost of insurance against loss.

13. The computerized method of claim 7, wherein the varying of selected values includes varying values of future predicted market-demand to maximize expected profit while operating to limit risk to a chosen level selected from the plurality of levels of risk.

14. The computerized method of claim 7, wherein the varying of selected values includes varying values of future predicted risk-mitigation costs to maximize expected profit while operating to limit risk to a chosen level selected from the plurality of levels of risk.

15. A non-volatile computer-readable medium having instructions stored thereon that when executed by a suitably programed first server system operably connected to the internet, performs a method comprising:
  eliciting and receiving into the first server system information based on characteristics of a group of animals including number of each sex, weight, age, and strain;
  eliciting and receiving into the first server system information including optimal diet, environmental conditions, group size, predicted mortality rate, predicted yield, and financial figures from the internet;
  eliciting and receiving into the first server system information including type of feed and nutritional values of various ingredients thereof;
  storing a plurality of different risk-level values in the first server system for each one of a plurality of levels of risk including a risk-level value for a first level of risk; and
  varying selected values for each of sex, weight, strain, optimal diet,
  environmental conditions, predicted yield, marketing age, and financial figures and, for each of a plurality of combinations of the selected varied values; and
  calculating an expected profit conditioned to each one of the plurality of stored plurality of different risk-level values while using each of a plurality of the varied selected values in order to maximize profit conditioned to the first level of risk.

16. The medium of claim 15, wherein the animals are turkeys, the medium having instructions stored thereon such that the method further includes:
  calculating an expected profit for each of a plurality of the varied selected values in order to maximize profit for each one of the plurality of levels of risk; and
  outputting a curve of likelihoods of profit values over a range of profit levels for each of the plurality of risk levels.

17. The medium of claim 15, wherein the animals are turkeys, the medium having instructions stored thereon such that the method further includes:
  calculating a turkey-weight-versus-time trajectory that an average turkey of the sex and strain reaches its optimum rate-of-growth versus age and uses this information to simultaneously determine an appropriate size for the group of turkeys, the type and amount of feed that should be fed to the group of turkeys, and the age at which the group of turkeys should be sold to a food processor, in order to maximize profits realized by a commercial integrator who subcontracts meat production.

18. The medium of claim 15, wherein the financial figures used to maximize profit include a cost of transportation and a cost of feed storage at each of a plurality of future moments in time.

19. The medium of claim 15, wherein the financial figures used to maximize profit include a cost of borrowing money and a cost of insurance against loss.

20. The medium of claim 15, the medium having further instructions stored thereon such that the method further includes:
    eliciting and receiving into the first server system information based on genetics, resistances to diseases and pests, water needs and drought-tolerance characteristics of a crop;
    eliciting and receiving into the first server system information including fertilizer, mineral and nutrient data characteristics for a growth model of the crop; and
    varying selected values for each of crop nutrients and trace elements and, for each of a plurality of combinations of the selected varied values of crop nutrients and trace elements, calculating an expected profit conditioned to each one of the plurality of risk-level values while using each of a plurality of the varied selected values in order to maximize profit of crop growth and animal growth conditioned to the first level of risk.

* * * * *